(12) United States Patent
Hohl et al.

(10) Patent No.: US 8,665,840 B2
(45) Date of Patent: Mar. 4, 2014

(54) USER INTERFACE BASED ON MAGNETIC INDUCTION

(75) Inventors: Fritz Hohl, Stuttgart (DE); Matthias Riedel, Stuttgart (DE); Juan Nogueira-Nine, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 1053 days.

(21) Appl. No.: 12/282,765

(22) PCT Filed: Jan. 22, 2008

(86) PCT No.: PCT/EP2008/000466
§ 371 (c)(1),
(2), (4) Date: May 1, 2009

(87) PCT Pub. No.: WO2008/089958
PCT Pub. Date: Jul. 31, 2008

(65) Prior Publication Data
US 2009/0323586 A1 Dec. 31, 2009

(30) Foreign Application Priority Data
Jan. 26, 2007 (EP) .................................. 07101260

(51) Int. Cl.
*H04W 4/00* (2009.01)
*H04W 84/12* (2009.01)
(52) U.S. Cl.
CPC .................................... *H04W 84/12* (2013.01)
USPC ....................... 370/338; 370/252; 455/404.2
(58) Field of Classification Search
USPC ............... 370/252, 315, 328, 338; 455/404.2, 455/440, 456.1–456.6
See application file for complete search history.

(56) References Cited

U.S. PATENT DOCUMENTS

| | | | |
|---|---|---|---|
| 3,868,565 | A | 2/1975 | Kuipers |
| 4,945,305 | A | 7/1990 | Blood |

(Continued)

FOREIGN PATENT DOCUMENTS

| | | |
|---|---|---|
| EP | 1 601 929 | 7/2005 |
| WO | 90 12276 | 10/1990 |

(Continued)

OTHER PUBLICATIONS

Andreas Savvides, et al., "Dynamic Fine-Grained Localization in Ad-Hoc Networks of Sensors", Networked and Embedded Systems Lab, Department of Electrical Engineering, Jul. 2001, pp. 166-179.

(Continued)

*Primary Examiner* — Kan Yuen
(74) *Attorney, Agent, or Firm* — Oblon, Spivak, McClelland, Maier & Neustadt, L.L.P.

(57) ABSTRACT

A receiving and transmitting node for a wireless data network, and a wireless data network based on magnetic induction. The receiving node includes an antenna receive module for receiving one or more data signals emitted from the transmitting node and a calculation module adapted to calculate one or more distances between the receiving node and the transmitting node, and/or adapted to calculate the position of the transmitting node in relation to the position of the receiving node, and/or adapted to calculate the orientation of the transmitting node in relation to the orientation of the receiving node. The reception of the data signal is based on magnetic induction and the calculation of the one or more distances, and the position of the transmitting node and/or the orientation of the transmitting node is based on the one or more data signals.

22 Claims, 10 Drawing Sheets

(56) References Cited

U.S. PATENT DOCUMENTS

| | | | |
|---|---|---|---|
| 5,600,330 | A | 2/1997 | Blood |
| 5,833,608 | A | 11/1998 | Acker |
| 6,369,564 | B1 | 4/2002 | Khalfin et al. |
| 6,686,881 | B1 | 2/2004 | Lu et al. |
| 7,719,994 | B2 * | 5/2010 | Zumsteg ............... 370/252 |
| 7,995,997 | B2 * | 8/2011 | Vare et al. ............ 455/414.2 |
| 2003/0008671 | A1 * | 1/2003 | Lundgren et al. ........ 455/456 |
| 2010/0110835 | A1 * | 5/2010 | Rhodes et al. ............ 367/131 |

FOREIGN PATENT DOCUMENTS

| | | |
|---|---|---|
| WO | 96 02008 | 1/1996 |
| WO | WO 2004/085896 A1 | 8/2004 |
| WO | 2006 134327 | 12/2006 |

OTHER PUBLICATIONS

Nissanka B. Priyantha, et al., "Anchor-Free Distributed Localization in Sensor Networks", Tech Report #892, MIT Laboratory for Computer Science, Apr. 2003, pp. 1-13.

Eugene Paperno et al., "A New Method for Magnetic Position and Orientation Tracking", IEEE Transactions on Magnetics, vol. 37, No. 4, Jul. 4, 2001, pp. 1938-1940.

Federico Thomas, et al., "Revisiting Trilateration for Robot Localization", Submitted to the IEEE Transactions on Robotics and Automation, pp. 1-9.

Technology, File://D:/PAE06-042 WSL/wacom.html, C. 2002. 4 pages.

* cited by examiner

USER INTERFACE BASED ON MAGNETIC INDUCTION

The present invention relates to the field of wireless data communication, to the field of user interfaces and to the field of magnetic induction based distance, position and orientation measurement. The present invention especially relates to a receiving node for a wireless data network, a transmitting node for a wireless data network and a wireless data network based on magnetic induction.

DESCRIPTION OF THE RELATED PRIOR ART

Graphical user interfaces (GUIs) are a widespread kind of user interfaces for information processing systems. GUIs allow users to efficiently utilize a system without having an understanding of a command language. GUIs provide specific input devices like a keyboard, a touchscreen or a computer mouse in order to let the user interact with the system.

Object of the present invention is to provide an economic technique for distance, location and/or orientation measurement in wireless data networks.

BRIEF DESCRIPTION OF THE PRESENT INVENTION

This object is achieved by a receiving node for a wireless data network and a wireless data network based on magnetic induction according to the present invention defined in claims 1 and 21, respectively.

The receiving node for a wireless data network according to the present invention comprises an antenna receive module for receiving one or more data signals emitted from a transmitting node of the wireless data network and a calculation module adapted to calculate one or more distances between the receiving node and the transmitting node and/or adapted to calculate the position of the transmitting node in relation to the position of the receiving node and/or adapted to calculate the orientation of the transmitting node in relation to the orientation of the receiving node, wherein said reception of said data signal is based on magnetic induction and said calculation of said one or more distances, said position of said transmitting node and/or said orientation of said transmitting node is based on said one or more data signals.

In the receiving node for a wireless data network according to the present invention received signals carry data and at the same time are used for distance, position and/or location determination, therefore much of the receiver circuitry serves a double purpose with the effect that manufacturing costs are low, the node is small and lightweight and power consumption is low.

Advantageously, said one or more data signals comprise one or more preamble portions and said calculation of said one or more distances, said position of said transmitting node and/or said orientation of said transmitting node is based on said one or more preamble portions.

Advantageously, said antenna receive module is adapted to determine one or more RSSI values, whereby an RSSI value indicates the strength of one of said one or more received data signals and said calculation of said one or more distances, said position of said transmitting node and/or said orientation of said transmitting node is based on said one or more RSSI values.

Advantageously, said wireless data network comprises a node adapted to control an output device and said receiving node comprises a user interface module which, in cooperation with said transmitting node and said output device, is adapted to provide a user interface functionality, whereby said provided user interface functionality is based on the calculated one or more distances, the calculated position of said transmitting node and/or the calculated orientation of said transmitting node.

In this case it is advantageous when the output device is adapted to display information on a two dimensional display surface and said user interface module is adapted to calculate a position on a two dimensional reference surface based on the calculated one or more distances and/or the calculated position of said transmitting node, whereby a position on said reference surface corresponds to a position on said display surface.

In this case it is advantageous when said user interface module is adapted to calculate said position on said reference surface based on the calculated orientation of said transmitting node.

In case said transmitting node has an associated pointing direction it is advantageous wherein said user interface module is adapted to calculate said pointing direction based on the calculated orientation of said transmitting node and said position on said reference surface is based on said pointing direction.

In this case it is advantageous when said calculated position on said reference surface corresponds to the intersection of said reference surface with a straight line which is defined by said position of said transmitting node and said pointing direction of said transmitting node.

Advantageously, the size of a pointer icon which is provided as a component of said user interface functionality is based on the distance between the calculated position of said transmitting node and said position on said reference surface.

In case said antenna receive module is adapted to determine one or more RSSI values it is advantageous when said antenna receive module comprises two antenna devices adapted to receive said one or more data signals, said two antenna devices lying on an X-axis of an orthogonal coordinate system defined by said X-axis, a Y-axis and a Z-axis, the calculated position of said transmitting node is the position of a reference point of said transmitting node, the calculated position of said transmitting node is described by one or more coordinate values comprising a first coordinate value, whereby a reference plane parallel to the X-Y-plane is defined, a normal orientation of the transmitting node is defined in which the straight line defined by said reference point and a second point of the transmitting node which is lying between said reference plane and said reference point is parallel to the Z-axis and moving said transmitting node in positive X-direction while keeping said transmitting node in said normal orientation and tilting said transmitting node out of said normal orientation in a way that said second point is moved in positive X-direction while keeping the position of said transmitting node constant both increase said first coordinate value.

In this case it is advantageous when said two antenna devices of said antenna receive module are coplanar, parallel and/or orthogonal to the X-Y plane.

Advantageously, said straight line defined by said reference point and said second point corresponds to a direction where the strength of a data signal emitted by said transmitting node has a local or a global maximum.

Advantageously, said one or more coordinate values describing said calculated position of said transmitting node comprises a second coordinate value and moving said transmitting node in positive Z-direction while keeping said transmitting node in said normal orientation increases said second coordinate value and tilting said transmitting node out of said normal orientation in a way that said second point is moved in Y-direction while keeping the position of said transmitting node constant either increases or decreases said second coordinate value.

In this case, the receiving node advantageously comprises a user interface module adapted to provide user interface logic operable to control the size of a pointer icon depicted by a display device based on said second coordinate value.

Advantageously, said user interface logic is adapted to control the selection and deselection of objects displayed by said display device based on said second coordinate value.

Alternatively to the above described behavior of the second coordinate, moving said transmitting node in positive Y-direction while keeping said transmitting node in said normal orientation and tilting said transmitting node out of said normal orientation in a way that said second point is moved in positive Y-direction while keeping the position of said transmitting node constant may both increase said second coordinate value.

Advantageously, said reference plane is the X-Y plane. Alternatively, said transmitting node is located in the X-Y plane.

The wireless data network based on magnetic induction according to the present invention comprises a transmitting node and a receiving node according to the present invention.

In the wireless data network based on magnetic induction according to the present invention there is no need to emit a separate signal for distance, position and/or position determination besides the data signal, therefore power consumption is reduced and bandwidth required for a separate signal is saved.

DESCRIPTION OF THE PREFERRED EMBODIMENTS

Figure 1:
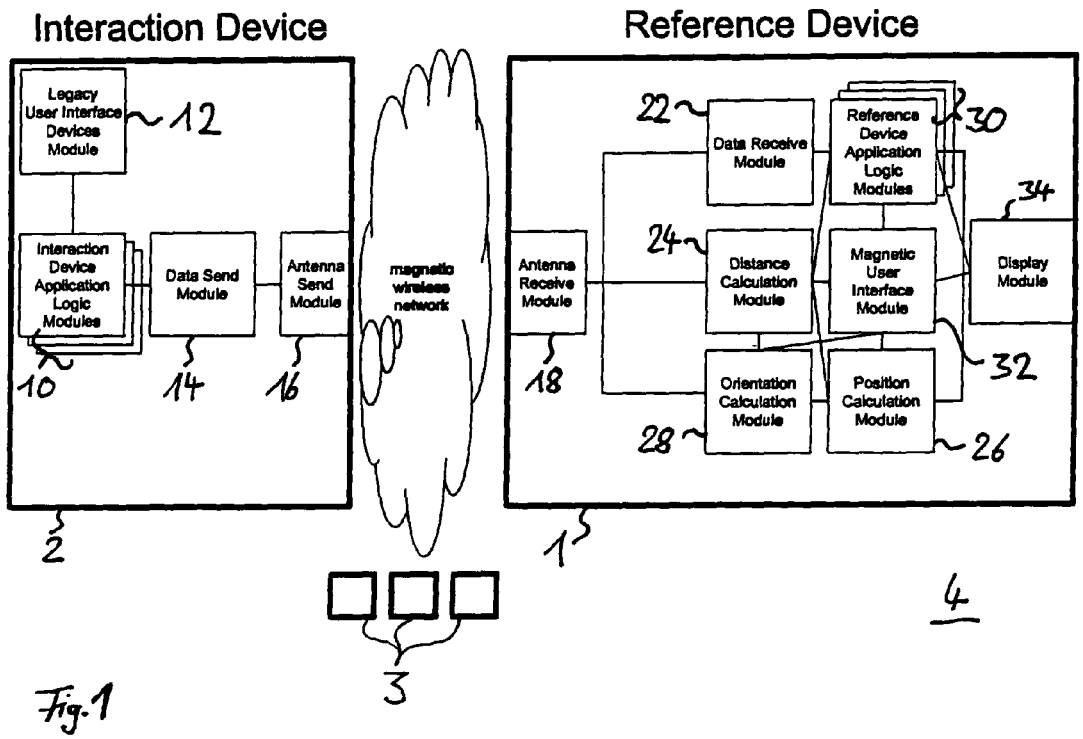
FIG. 1 shows a schematic view of an embodiment of a wireless data network according to the present invention comprising a receiving node and a transmitting node.

A preferred embodiment of the present invention is now explained with reference to FIG. 1 which shows a wireless data network 4 comprising a receiving node 1, which is also called a reference device 1, a transmitting node 2, which is also called an interaction device 2 and other nodes 3 of the network 4, which are also called other devices 3. The transmission of data between the nodes 1, 2, 3 of the network 4 is based on magnetic induction. The receiving node 1, transmitting node 2, and other nodes 3 may for example be a mobile device, a mobile phone, a personal digital assistant, a computer hardware such as peripheral device, an input device, an output device, a data storage device. Further, the receiving node may for example be an intelligent refrigerator, a personal computer, a special distance, position and/or orientation measurement device, a display device, a wireless keyboard. Further, the transmitting node may, for example, be a portable storage device such as a wireless memory stick, a portable music player, a still camera, a video camera, a remote control. With the reference device 1 there is associated a reference device role and with the interaction device there is associated an interaction device role, which will become apparent from the following explanations. The interaction device 2 and the reference device 1, may take only one role, that is, may act only as interaction device or as reference device, respectively, or may take both roles over time and act as interaction device and as reference device alternately. For the purpose of explanation the reference device 1 is described only in its role as reference device and the interaction device 2 is described only in its role as interaction device. It is to be understood, however, that, in case the reference device 1 serves as reference device and as interaction device, the reference device 1 also comprises the components of the interaction device 2 and provides the same functionality as the interaction device 2 and that, in case the interaction device serves 2 serves as interaction device and as reference device, the interaction device 2 also comprises the components of the reference device 1 and provides the same functionality of the reference device 1. In this case, a single component, an antenna device or a processing unit for example, may serve both device roles. Such may be achieved, for example, by letting a component in question serve one role at a time.

The interaction device 2 comprises interaction device application logic modules (IDALM) 10, a legacy user interface devices module (LUIDM) 12, a data send module (DSM) 14 and an antenna send module (ASM) 16.

The reference device 1 comprises an antenna receive module (ARM) 18, a data receive module (DRM) 22, a distance calculation module (DCM) 24, a position calculation module (PCM) 26, an optional orientation calculation module 28, reference device application logic modules (RDALM) 30, a magnetic user interface module (MUIM) 32 and an optional display module (DM) 34.

The information processing capability of the modules may be implemented in hardware and software, either alone or in combination. Only modules with direct connection to the present invention are described. Other modules, which are required to implement the interaction device 2 and the reference device 1, such as power supply and casing for example, are obvious to the skilled person and their description is omitted.

The component modules of the interaction device 2 will now be explained.

Interaction Device Application Logic Modules (IDALM)

The IDALMs 10 are the interaction device part of different applications. The word application signifies a service (e.g. a data transfer service) as well as a corresponding logic, for example, a software program information, which, when executed, provides the service. In order to provide its service, an application may rely on other services. Each application comprises a reference device application logic module (RDALM) 30 and an optional interaction device application logic module (IDALM) 10. For example, if a given application is a file transfer service between the interaction device 2 and the reference device 1, the IDALM part 10 contains the logic that allows to send data upon receiving an event indicating that the file transfer should start. To that end, an IDALM 10 can use the LUIDM 12 in order to interact with the user of the interaction device 2 and the data send module 14 in order to communicate with the reference device 1 or other members of the network 4. There are possible applications where this part is empty, for example, when the interaction device 2, in its role as interaction device, is used as a pointer device.

Legacy User Interface Devices Module (LUIDM)

The LUIDM 12 provides one or more legacy means for the IDALM 10 to interact with the user of the interaction device 2. These legacy means may include, for example, buttons, sliders, knobs, displays, loudspeakers and microphones.

Data Send Module (DSM)

The data send module 14 allows the IDALM 10 to send data to the reference device 1 and/or the other nodes 3 of the wireless network 4. In order to achieve this, the data send module 14 makes use the antenna send module 16. It is to be noted here that, in order to ensure the distance measurement capability, it may be necessary, in case of no data to be transmitted for the IDALM 10, to send from time to time empty, redundant, random or nonsense data transmissions to the reference device 1.

Antenna Send Module (ASM)

Figure 2:
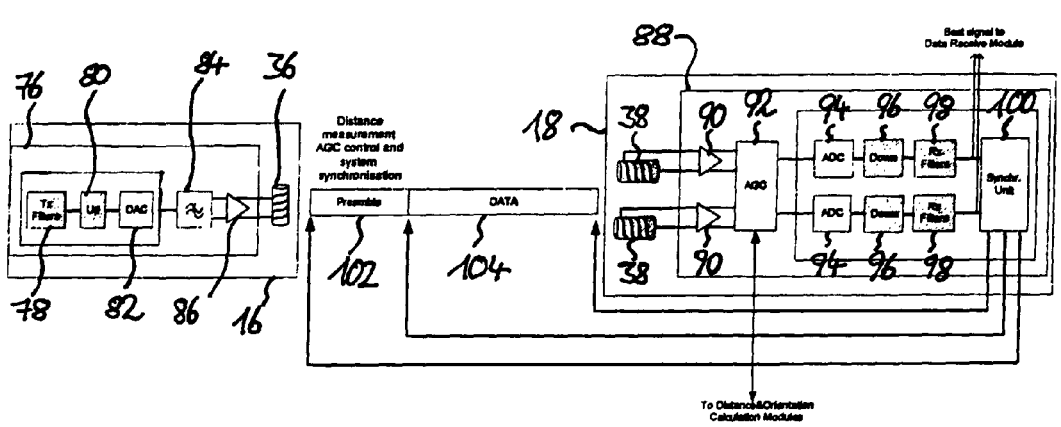
FIG. 2 shows a schematic view of an antenna send module of the transmitting node and an antenna receive module of the receiving node.
Figure 16:
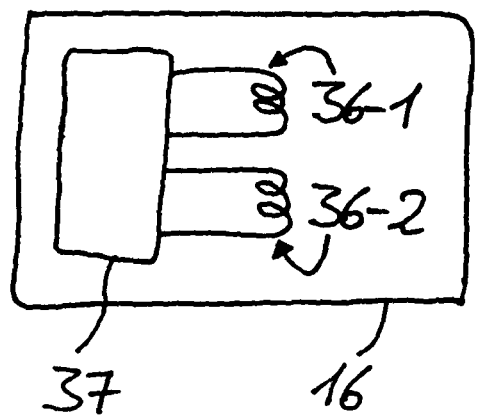
FIG. 16 shows a antenna send module comprising two antenna devices.

The antenna send module 16 contains one or more antenna devices 36 to convert electric signals into magnetic signals. FIG. 2 shows an antenna send module 16 comprising one antenna device 36. As antenna devices 36, for example, loop antennas either with or without ferrites may be employed. The antenna device(s) 36 of the antenna send module will in the following be referred to as transmitter antenna device(s) 36. In case that the antenna send module 16 provides a multitude of antenna devices 36, the data send module 14, when communicating with the reference device 2, selects an antenna device and ensures that the knowledge about which antenna device was used is also transferred to the reference device 1. This may be accomplished, for example, by including an identification value of the antenna device in the data transmission. FIG. 16 shows an antenna send module 16 comprising two antenna devices 36-1, 36-2 and an antenna driver circuitry 37. The antenna driver circuitry 37 is adapted to feed the antenna devices 36-1, 36-2 with the signal to be sent. The data send module 14 controls the antenna driver circuitry 37 so that the selected antenna device 36-1, 36-2 is used to emit the signal. As a result, the antenna send module 16 sends data from the data send module 14 to a node, for example the reference device 1, of the network 4 using this network 4 using magnetic induction technology.

The component modules of the reference device 1 will now be explained.

Antenna Receive Module (ARM)

The antenna receive module 18 in this embodiment of the invention contains at least two antenna devices 38 to convert magnetic signals into electric signals. FIG. 2 shows an antenna receive module 18 comprising two antenna devices 38. As antenna devices 38, for example, loop antennas either with or without ferrites can be employed. The antenna devices 38 of the antenna receive module will in the following be referred to as receiver antenna devices 38. While in this embodiment the antenna receive module 18 comprises at least two antenna devices 38, the present invention may also be implemented with only one receiver antenna device 38. The antenna receive module 18 receives signals from a node, for example the interaction device 2, of the network 4 using this network 4 using magnetic induction technology. The antenna receive module 18 measures the level of the voltage induced in every one of the receiver antenna devices 38. Such measured level provides an indication of the received signal strength which is called the received signal strength indication (RSSI). The RSSI values are given to the distance calculation module 24 and, if applicable, to the optional orientation calculation module 28. Since a multitude of receiver antenna devices 38 are provided, the antenna receive module 18 selects the best received signal and provides the selected signal to the data receive module 22. Hereby, the best received signal may, for example, be given by the signal with the highest RSSI. Instead of selecting one signal, a combined signal which is based on a plurality of the received signals may be provided to the data receive module 22. In case the optional orientation calculation module 28 is provided, the received signals may be provided to it.

Data Receive Module (DRM)

The data receive module 22 receives data from the interaction device 2 and other nodes 3 of the wireless network using the antenna receive module 18. Received data is passed on to the appropriate RDALM 30.

Distance Calculation Module (DCM)

The distance calculation module 24 calculates spatial distances from the antenna receive module 18 to the antenna send module 16 based on the indicators of the received signal strengths provided by the antenna receive module 18. The distances calculated are distances between transmitter antenna devices 36 and receiver antenna devices 38. The number of distances to be calculated depends on the number of transmitter antenna devices 36, on the number of receiver antenna devices 38 and on the question of how many receiver antenna devices 38 received signals from one transmitter antenna device 36. The number of distances is given by the number of transmitter antenna device to receiver antenna device signal transmissions. If, for example, there is one antenna device 36 in the antenna send module 16 and two antenna devices 38 in the antenna receive module 18, two distances are calculated if both receiver antenna devices 38 received the signal sent by the sender antenna device 36. As the data send module 14, in case of a plurality of transmitter antenna devices 36, ensures that the knowledge about which antenna device 36 was used is transferred to the reference device 1, the distance calculation module 24 knows to which transmitter antenna device 36 and to which receiver antenna device 38 a calculated distance belongs.

Methods of calculating the distance from the strength of a received signal are well known. There is no limitation to a representation of the characteristic function providing the link between the distance and the received signal strength indication (RSSI). Generally any numerical, analytical, mathematical, or algorithmic description might be used. Within the current embodiment a look-up table storing sensor response information and approximating functions, comprising spline interpolation functions, are used to convert the RSSI value into distance information. Hereby, an approximation function is to be used for a specific range of values of the RSSI and the look-up table provides the approximation function that is to be used for mapping a specific value of the RSSI.

The calculated distances are given to the RDALM 30, the magnetic user interface module 32, the position calculation module 26 and, if applicable, to the optional orientation calculation module 28.

Position Calculation Module (PCM)

The position calculation module (PCM) 26 in this embodiment calculates positions based on the distances provided by the distance calculation module 24. Thus, the positions calculated are positions of the one or more transmitter antenna devices 36. However, generally, the calculation of position need not be based on distances. The positions calculated are relative to a coordinate system anchored at the reference device 1. The position may either be a 2D or a 3D position, that is, provides location information in a two dimensional or a three dimensional space, respectively. To calculate positions, a two or three dimensional positioning algorithm based on distances is employed. As a prerequisite, one of the receiver antenna devices 38 is set to the position (0,0) (or (0,0,0)). Then, another one of the receiver antenna devices 38 is set to the position (d,0) (or (d,0,0)), where d equals the distance between these two receiver antenna devices 38. This is continued until all receiver antenna devices 38 have a position in the relative coordinate system they define. A n-dimensional (n=2, 3) positioning algorithm is a calculation method that returns the n-dimensional position of a node j given the positions of a number of nodes j to (j−1) and the known distances of the node 1 to the nodes 1 to (j−1). All kinds of two dimensional or three dimensional positioning algorithms can be employed, including for example bilateration, trilateration and multilateration, whereby maximum likelihood estimations and mass spring optimization techniques may be employed. One example is a 3D trilateration algorithm. This algorithm requires four known position and the distances from an unknown position to these known positions. In principle this algorithm computes the intersection point of four spheres centered at the known positions. This is done by first computing the two possible intersection points of three intersecting spheres. The article "Revisiting Robot Trilateration for Robot Localization" of Federico Thomas and Lluis Ros published in the IEEE Transactions on Robotics, Vol. 21, No. 1, pp. 93-101, February 2005 gives an implementation of this part of the algorithm. Then, one of these intersection points is selected by calculating and comparing the distances of these intersection points to the fourth known position with the given distance to the fourth known position. Advantages of this algorithm are that it is computationally less complex and that it yields perfect results when the distance accuracy is perfect. Disadvantages of this algorithm are that the resulting position is very sensitive to distance accuracy errors and that more known positions and their distances do not lead to a higher positioning accuracy. Another example is a 2D multilateration algorithm. An advantage of this algorithm is that more known positions and their distances lead to a higher positioning accuracy. An disadvantage is that it is computationally rather complex. The article "Dynamic Fine-Grained Localization in Ad-Hoc Networks of Sensors" of Andreas Savvides, Chih-Chieh Han and Mani Strivastava published in the Proceedings of ACM SIGMOBILE 7/01, pp. 166-179, 2001 gives an implementation of this algorithm, whereby a minimum mean square type maximum likelihood estimation is used to solve overdetermined systems of equations. Still a further example is a mass spring type optimation algorithm. The article "Anchor-free distributed localization in sensor networks", Technical Report TR-892, MIT Laboratory of Computer Science, April 2003 gives an implementation of this algorithm.

In case of two receiver antenna devices 38, the distance calculation module can calculate two distances to a transmitter antenna device 36 and the position calculation module 26 can calculate a 2D position of the transmitter antenna device 36. The geometric principle underlying the position calculation in this case is explained with reference to FIG. 3 which shows two antennas devices 38-1, 38-2 of the antenna receive module 18, a plane 40 parallel to a straight line 42 connecting the two antennas 38, a sphere 44 centered at one of the antenna devices 38-1 with radius corresponding to the distance measured based on the received signal strength at the antenna devices 38-1 and a sphere 46 centered at the other antenna device 38-2 of said antenna devices 38-1, 38-2 with a radius corresponding to the distance measured based on the signal strength received by the antenna device 38-2. The intersection of the two spheres 44, 46 yields a circle 48 with an axis which coincides with the straight line 42. In case the spheres 44, 46 do not intersect, the distances may be increased in the same ratio until they do intersect. The intersection of the circle 48 with the plane 40 yields two possible positions 50, 52 of the transmitter antenna 36 within the plane 40. If one of the possible positions (e.g. position 52) can be excluded for any reason, including exclusion by definition, an unambiguous two dimensional position (e.g. position 50) of the transmitter antenna 36 within the plane 40 can be calculated by the position calculation module 26. The two dimensional position 50 is naturally described by an X'-value of which the variation describes the translation of the position 50 along the straight line 42 and by a Y'-value which describes the distance of the position 50 to the straight line 42. The straight line 42 defines an X'-direction. A straight line (not shown) within the plane 40 and orthogonal to the straight line 42 defines a Y'-direction.

The plane 40 can be chosen to be any plane that is parallel to the straight line 42. Of course, the distance of the plane 40 to the straight line 42 must be equal or smaller than the radius of the circle 48, otherwise no points of intersection 50, 52 are obtained.

Figure 4:
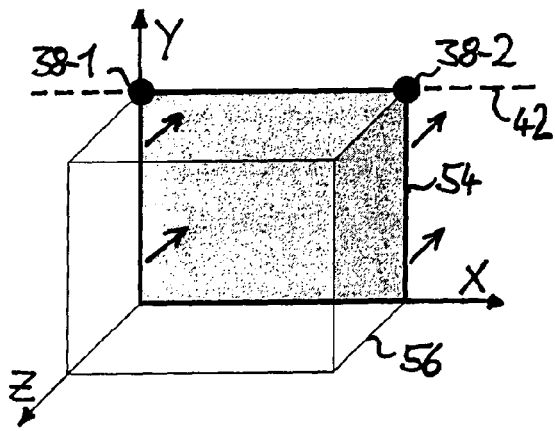
FIG. 4 shows a possible arrangement of a display surface, antenna devices and an expected space of location of the transmitting node.

In a first application case, the plane 40 may be chosen to coincide with a display surface—such as, for example, the display area 54 depicted in FIG. 4—or may be chosen to be a surface close to a display surface and/or may be chosen to be a surface parallel to a display surface. In these cases, the position of the interaction device 2, described by the X'- and the Y'-value, corresponds to a position on the display surface, which may, for example, be described by corresponding X- and Y-coordinates. A user typically is not restricted to move the interaction device 2 only in the plane 40 as defined above, but the user may be instructed to do so. The user may be aided in doing so by a guiding material surface (e.g. a transparent screen). Regardless of whether the user follows the instructions or not, the position calculation module 26 calculates the position assuming that the interaction device 2 is located within the plane 40. In case the plane 40 comprises the straight line 42, the geometric problem is effectively two-dimensional, which reduces the complexity of calculation.

In a second application case, the plane 40 may be chosen to be orthogonal to a display surface (e.g. orthogonal to the display area 54 depicted in FIG. 4). In this case, the X'-value corresponds to a 1D position on the display surface, for example, a position along an axis parallel to the straight line 42 and the Y'-value corresponds to the distance of the interaction device 2 to the display surface. The user typically is not restricted to move the interaction device 2 in the plane 40 as defined above, but the user may be instructed to do so. The user may be aided in doing so by a guiding material surface (e.g. a table top). Regardless of whether the user follows the instructions or not, the position calculation module 26 calculates the position assuming that the interaction device 2 is located within the plane 40. In case the plane 40 comprises the straight line 42, the geometric problem is effectively two-dimensional, which reduces the complexity of calculation.

A two-dimensional geometric problem is always achieved in case that the plane 40 is taken to be a plane comprising the interaction device 2 and the antenna devices 38-1, 38-2.

Clearly, the first application case can be generalized in that the plane 40 is not restricted to coincide with a display surface, is not restricted to be a surface close to a display surface and is not restricted to be a surface parallel to a display surface. Obviously, even without this restrictions, a two dimensional position 50 described by the X'-value and the Y'-value can be determined. This two dimensional position can be mapped to another two dimensional value, for example, a two dimensional position described by a X-coordinate and a Y-coordinate of a display area.

Clearly, the second application case can be generalized in that the plane 40 is not restricted to be orthogonal to a display surface. Obviously, even without this restriction, a two dimensional position 50 described by the X'-value and the Y'-value can be determined. The X'-value can be mapped to a 1D position on the display surface, for example, a position along an axis parallel to the straight line 42. The Y'-value corresponds to the distance of the interaction device 2 to the intersection of the plane 40 with the display surface. In case the plane 40 comprises the straight line 42, the Y'-value corresponds to the distance of the interaction device 2 to the straight line 42. Thus, the Y'-value can be seen as a measure of distance of the interaction device 2 to the display surface and is an example of a generalized distance which the user interface described below makes use of in order to provide novel user interaction means.

Exclusion of one of the possible positions 50, 52 can be achieved, for example, by placing the receiver antenna devices 38-1, 38-2 in a way that one of the two possible positions 50, 52 (e.g. position 52) is outside the zone the interaction device 2 is expected to be. FIG. 4 shows such an arrangement. Here, the receiver antenna devices 38-1, 38-2 are located at the left and right top corners (alternatively at left and right bottom corners) of a rectangular display area 54 and the interaction device 2 is only expected to be in a cuboid formed region 56 in front of the display area 54. This achieves the desired effect. The problem of two possible positions arises also in case of determining a three dimensional position based on three distances. Exclusion of one of the possible positions can be achieved in a similar way, that is, by restricting the zone the interaction device 2 can be expected in, which may be achieved by an appropriate choice of the locations of the receiver antenna devices 38. In case the interaction device 2 can not be expected to roam within a restricted zone, exclusion can be achieved by adding a third receiver antenna device proving a third distance in the 2D case and by adding a fourth receiver antenna device providing a fourth distance in the 3D case.

The display area 54 lies within a X-Y plane of an orthogonal coordinate system with a horizontal X-axis, a vertical Y-axis and a horizontal Z-axis. The straight line 42 connecting the receiver antenna devices 38-1, 38-2 and defining the X'-direction, is parallel to the X-axis. A position on the display area 54 can be described by an X-value and a Y-value. Given this definition, two application cases of the two dimensional position 50 can be described. In the first application case, the calculated X'-value determines the X-value of a position on the display area 54 and the calculated Y'-value determines the Y-value of a position on the display area 54. This is an example of a case which will in the following be referred to as (X,Y)-case. In the (X,Y)-case, the calculated position and, if applicable, the orientation of the interaction device 2 calculated by the optional orientation calculation module 28 are used to determine a two dimensional position on a two dimensional display surface. In a second application case, the calculated X'-value determines the X-value of a position on the display area 54 and the calculated Y'-value corresponds to a generalized distance which controls, for example, the size of a pointer icon depicted on the display area 54. This is an example of a case which will in the following be referred to as (X,Z)-case. In the (X,Z)-case, the calculated position and, if applicable, the orientation of the interaction device 2 calculated by the optional orientation calculation module 28 are used to determine a one dimensional position on a two dimensional display surface and to further determine a generalized distance. On the generalized distance a plurality of interaction means of a user interface can be built upon. For example, the size of a pointer icon depicted on a display surface may be dependent on the generalized distance.

In case of three receiver antennas, the distance calculation module can calculate three distances to a transmitter antenna 36 and the position calculation module 26 can calculate a 3D position of the transmitter antenna 36. This case will be referred to in the following as (X,Y,Z)-case. The 3D position is described by an X-value, a Y-value, and a Z-value which correspond to the position of the interaction device 2 in X-direction, Y-direction and Z-direction, respectively. The Z-value can be seen as a distance to the display surface and can be employed in the same way as the Y'-value in case of the two dimensional (X,Z)-case, that is, may be employed as a general distance. The X-value and the Y-value can be employed in the same way as the X'- and Y'-values in case of the two dimensional (X,Y) case, that is, may be used to determine a two dimensional position on a two dimensional display surface.

While in the above explanations, it was assumed that the display area 54 and the receiver antenna devices 38-1, 38-2 are co-located this must not be the case. Generally, the display area 54 may be located at a different position than the receiver antenna devices 38. This is obviously possible, since it is irrelevant for the position determination if there is a display area 54 or not. All of the above could also have been explained with an imaginary surface instead of a display surface such as the display area 54. The situation compares to the case of a pen that is used on a graphics tablet. The absence of the requirement of co-location applies to the 2D case as well as to the 3D case. Also, the display surface need not be flat. The display surface may, for example, be a spherical cap or a rectangular section of a sphere. Obviously, mapping the X'- and Y'-values to a two dimensional display coordinate is possible also in case of a non flat display surface. Obviously, a user interface functionality which is dependent on the Y'-value or on the Z-value determined by the position calculation module 26, for example the size of a pointer icon depicted on the display surface, is possible also in case of a non flat display surface.

Figure 3:
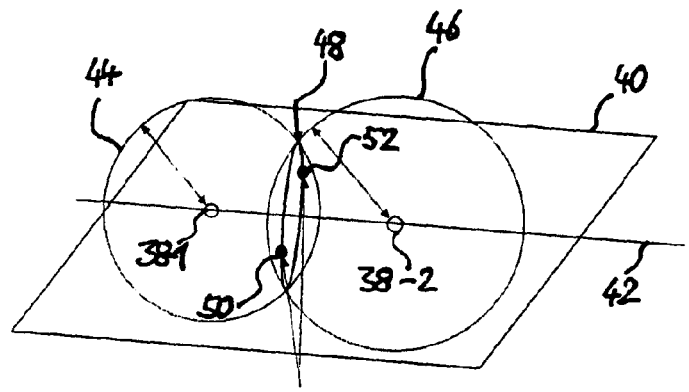
FIG. 3 shows the geometric principle underlying 2D position calculation based on distances.

A user can be instructed to operate the interaction device 2 only in a specific plane. For example, in a plane close to the display area 54, which is advantageous in the (X,Y)-case or in a plane orthogonal to the display area 54 and comprising the straight line 42 connecting the antenna devices 38-1, 38-2. In the latter case, the Y'-value corresponds to the distance to the display area 54, which is advantageous in the (X,Y)-case. Another example is a setup in which the actual display area 54 of FIG. 3 is translated along the Z-axis to a distant point, whereby the antenna devices 38-1, 38-2 stay in their places in the X-Y-plane, whereby the display area 54 may be enlarged or shrinked. Here, the user is instructed to move the interaction device 2 in the X-Y-plane below the straight line 42 connecting the antenna devices 38-1, 38-2, for example, in the region given by the original location of the display area 54. This setup is advantageous in the (X,Y)-case.

Since magnetic field lines are closed, the magnetic field produced by a sender antenna device 36 necessarily is not isotropic. The magnetic field produced by a sending circular loop antenna and the sensitivity of a receiving circular loop antenna to a magnetic field, is rotationally symmetric. The axis of symmetry is called the axis of the antenna and is the direction with the highest field intensity and the highest sensitivity. When rotating such loop antenna around its axis, the magnetic field generated by the antenna in a fixed point in space does not change. When rotating the antenna around an axis other than the symmetry axis, the magnetic field in a fixed point in space does change. It is clear that, in order to achieve the latter effect (i.e. the change of the magnetic field), an antenna device need not have an axis of symmetry and that the above rotationally symmetric loop antenna is given only as an example of a common antenna device. In order to achieve the effect of the changing magnetic field, the field produced by the antenna device must not exhibit rotational symmetry. In the following, the axis of a sending or receiving antenna device is seen as the direction of the strongest field intensity or field sensitivity, respectively. The orientation of an antenna device is given by the orientation of its axis. Antenna devices are coplanar, parallel and orthogonal when their axes are coplanar, parallel and orthogonal, respectively. An antenna device is orthogonal to another entity, a plane for example, when its axis is orthogonal to that entity.

The effect of changing the magnetic field perceived in a given point in space when the interaction device 2 is rotated, can be used to detect changes of orientation of the interaction device 2. When a user changes the orientation of the interaction device 2, the signal strengths (RSSI) of the signals received by the receiver antenna devices 38 change, which corresponds to a change of the X'- and Y'-values. Therefore, the user may choose to rotate the interaction device 2 instead of translating the interaction device 2.

In the setup of FIG. 4 the receiver antenna devices 38 are coplanar, that is, the two axes of the two antenna devices 38 lie in a common plane. This is an advantageous configuration which allows the user to rotate the interaction device 2 instead of translating the interaction device 2 in an intuitive manner.

In the setup of FIG. 4, in the (X,Z)-case, the receiver antenna devices 38 are oriented along the Z-axis. Generally, depending on the size and position of region 56 the interaction device is expected to be located in in relation to the position of the receiver antenna devices 38, the receiver antenna devices 38 may deviate from the Z-axis orientation, typically not more than by an angle of 30°, however. In the (X,Z)-case, the behavior of the position determination is as follows: When the interaction device 2 is hold in the region 56 it is expected to be in front of the X-Y plane and in a normal orientation in which the sending antenna device 36 is parallel the Z-axis, the user may move the interaction device 2 to the right, thereby increasing the X'-value, and may move the interaction device 2 to the left, thereby decreasing the X'-value. The normal orientation of the interaction device 2 is a fixed orientation independent of the position of the interaction device 2. The normal orientation may be described by giving the orientation of a straight line connecting two points of the interaction device 2, for example, a position reference point which corresponds to the position of the sending antenna device 36 and a second point. Instead of moving the interaction device 2, the user may also rotate the interaction device 2 clockwise (as seen from above) out of its normal orientation to increase the X'-value and rotate the interaction device 2 counter-clockwise (as seen from above) to decrease the X'-value. Thus the X'-value behaves similar to the spot generated on a surface by a laser pointer. Similarly, the user may move the interaction device 2 away from the X-Y-plane to increase the Y'-value and move the interaction device 2 towards the X-Y-plane to decrease the Y'-value. Instead of moving the interaction device 2, the user may also rotate the interaction device 2 clockwise (seen from right) to increase the Y'-value and counter-clockwise (seen from right) to decrease the Y'-value.

In the (X,Y)-case, the behavior of the position determination is as follows: When the interaction device 2 is hold in the region 56 it is expected to be and in a given normal orientation, the user may move the interaction device 2 to the right, thereby increasing the X'-value, and may move the interaction device 2 to the left, thereby decreasing the X'-value. The normal orientation of the interaction device 2 is a fixed orientation independent of the position of the interaction device 2. The normal orientation may be described by giving the orientation of a straight line connecting two points of the interaction device 2, for example, a position reference point which corresponds to the position of the sending antenna device 36 and a second point. Instead of moving the interaction device 2, the user may also rotate the interaction device 2 clockwise (as seen from above) out of its normal orientation to increase the X'-value and rotate the interaction device 2 counter-clockwise (as seen from above) to decrease the X'-value. Similarly, the user may move the interaction device 2 downwards to increase the Y'-value and move the interaction device 2 upwards to decrease the Y'-value. Instead of moving the interaction device 2, the user may also rotate the interaction device 2 clockwise (seen from right) to increase the Y'-value and counter-clockwise (seen from right) to decrease the Y'-value. Thus the position described by the X'- and the Y'-value behaves similar to the spot generated on a surface by a laser pointer.

Thus, the setup with one transmitter antenna device and two coplanar antenna devices provides a very simple implementation of a laser pointer effect. A calibration process may be carried out to determine the influence of the surrounding of the measurement system on the measurement process in order to improve the exactitude of the measurement system.

Alternatively, the laser pointer effect may be implemented, based on the orientation of the interaction device 2 as determined by the optional orientation calculation module 28.

The position calculation module 26 gives the calculated positions to the RDALM 30, the magnetic user interface module 32 and, if applicable, to the orientation calculation module 28.

Orientation Calculation Module (OCM)

The optional orientation calculation module 28 calculates the orientation of the interaction device 2 relative to the reference device 1. This may be a one, two or a three dimensional orientation. A one dimensional (ID) orientation is represented by a single variable and may, for example, describe the orientation of a vector within a two dimensional plane. A two dimensional (2D) orientation is represented by two variables and may, for example, describe the orientation of a vector within a three dimensional space. Such vector may, for example, represent a pointing direction of a laser pointer or a rod. A three dimensional (3D) orientation is represented by three variables and may, for example, describe the orientation of a real world object in three dimensional space. The 3D orientation may be represented by three angles called roll, pitch and yaw which describe the rotation of the interaction device 2 around the X-, Y- and Z-axis (see FIG. 4), respectively.

The orientation can be calculated in different ways. For example, the calculation of orientation may be based on the distances calculated by the distance calculation module 24. In the case of two receiver antenna devices 38 and two transmitter antenna devices 36, a 1D orientation of the interaction device 2 can be calculated based on the calculated distances. Another example is the use of mutually orthogonal antenna devices. In case of two mutually orthogonal sender antenna devices 36 and two mutually orthogonal receiver antenna devices 38, a 2D orientation can be calculated. In case of three mutually orthogonal sender antenna devices 36 and three mutually orthogonal receiver antenna devices 38, a 3D orientation can be calculated. By exciting at least some of the mutually orthogonal transmitter antenna devices 36 with a modulated field in order to generate a rotating magnetic field, the precision of orientation calculation might be increased. The article "A new method for magnetic position and orientation tracking", IEEE transactions on magnetics, vol. 37 no. 4, July 2001 of Eugene Paperno, Ichiro Sasada and Eduard Leonovich gives an example where a rotating field is generated that corresponds to the field of a rotating magnetic dipole.

Reference Device Application Logic Modules (RDALM)

The RDALMs 30 are the reference device part of the different applications (see the description of the IDALMs 10 above). A RDALM 30 can access distances calculated by the distance calculation module 24, positions calculated by the position calculation module 26, data transferred to the RDALM 30 by the interaction device 2 or by other nodes 3 of the network 4 via the data receive module 22, user interaction means provided by the magnetic user interface module 32 and, if applicable, orientations calculated by the orientation calculation module 28. A RDALM can access the display module 34 in order to present data to a user.

Magnetic User Interface Module (MUIM)

The magnetic user interface module 32 provides a software interface to the RDALMs 30 which enables the RDALMs 30 to interact with a user. The software interface provides a plurality of interaction means including a cursor functionality to the RDALMs 30 in a similar way a graphical user interface framework like Microsoft Windows provides interaction means to Windows programs. To that end, the magnetic user interface module 32 accesses the display module 34, uses distances calculated by the distance calculation module 24, positions calculated by the position calculation module 26 and, if applicable, orientations calculated by the orientation calculation module 28. In case the orientation calculation module 28 is provided, a laser pointer effect based on the position of the interaction device 2 determined by the position calculation module 26 and the orientation of the interaction device 2 determined by the orientation calculation module 28 is provided. In this case, a cursor position is calculated which corresponds to a spot a laser pointer forms on a display or reference surface, whereby the interaction device 2 takes the role of the laser pointer. As was shown above however, a laser pointer effect can also be achieved without the orientation calculation module 26. Depending on the distance, position and orientation determination capabilities of the reference device 1 when interworking with a specific interaction device 2, the requirements of a specific task and the preferences of a user, the magnetic user interface module 32 provides user interface means according to the (X,Y)-, (Y,Z)- or (X,Y,Z)-case.

In the (X,Y)-case, the interaction device can be used as a pointer, like for example a mouse or a track ball. In this case the interaction means used in the state-of-the art 2D graphical user interfaces are provided; the interaction device 2 can be integrated as another instance of a pointer. Common elements of a pointer, for example, buttons for clicking and a wheel for scrolling of a mouse are integrated in the interaction device 2. An IDALM 10 that uses the LUIDM 12 of the interaction device 2 can access these elements and sends corresponding events, like, for example, button-clicks and wheel-turns via the data send module 14 to the RDALM 30 of the reference device 1.

Also in the (X,Y,Z)-case, the interaction device 2 may be used as pointer, however, additional user interaction means are provided.

In the (X,Z)- or (X,Y,Z)-case, interaction means are provided that use the generalized distance. The generalized distance may be given by the Y'-value determined by position calculation module 26 in the (X,Z)-case or by the Z-value determined by the position calculation module 26 in the (X,Y,Z)-case. In case a laser pointer effect based on the orientation of the interaction device 2 provided by the optional orientation calculation module 28 is implemented, the generalized distance may be given by the distance from the calculated position of the interaction device 2 to the calculated cursor position on the display or reference surface. The provided generalized distance based interaction means include, for example, 'Z cursor', 'Z click', 'selection wheel' 'stick-and-glue' and 'X axis threading'. These interaction means are described below.

In the following, the interaction means which are based on the generalized distance are described. In case the reference device 2 comprises a display module 34, a user can increase or decrease the generalized distance by moving the interaction device away from or towards the display surface, respectively. In case the reference device 2 does not comprise a display module 34, a user can increase or decrease the generalized distance by moving the interaction device 2 away from or towards a corresponding imaginary surface defined by the arrangement of the antenna devices 38 of the reference device 1.

Figure 5:
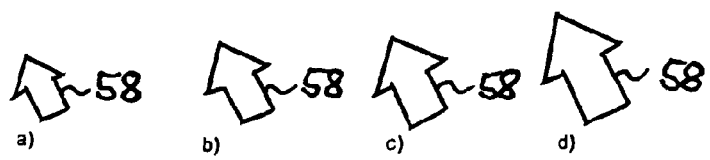
FIG. 5 shows various phases of a 'Z cursor' interaction means.

FIG. 5 shows various phases of the 'Z cursor' interactions means, wherein the size of a cursor icon 58 depends on the generalized distance. The size of the cursor 58 increases with increasing generalized distance.

Figure 6:
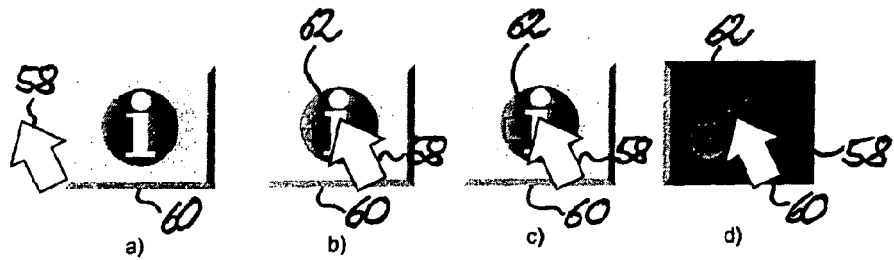
FIG. 6 shows various phases of a 'Z click' interaction means.

FIG. 6 shows different phases of the 'Z click' interaction means. This interaction means corresponds to the 'clicking' action of a mouse. Instead of pressing a mouse button for firing this action, the user decreases the generalized distance. If the generalized distance is smaller than a given threshold for a given period of time, the action is fired. To facilitate the interaction of the user with the 'Z click' interaction means, it is indicated if the threshold is reached and how long it takes to reach the firing period of time. In case of a button 60, this could be visualized, for example, by changing the color of the button 60 and by showing a clock or clock hand symbolizing timer element 62 in different phases. In phase a) the cursor did not yet enter the region of the button 60. In phase b) the cursor just entered the button. In phase c) a quarter of the firing period has already passed. In phase d) the full firing period has passed and the "clicking action" is fired.

Figure 7:
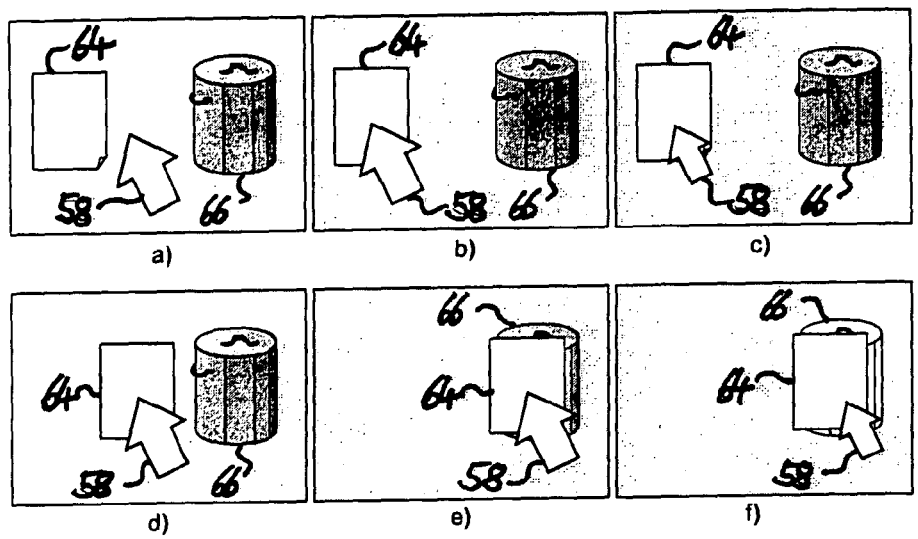
FIG. 7 shows various phases of a 'stick-and-glue' interaction means.

FIG. 7 shows different phases of the 'stick-and-glue' interaction means. This interaction means corresponds to the 'drag-and-drop' interaction element of conventional 2D GUI Frameworks. The goal is to select an object 64 visible on the display and to move the object 64 to a target object 66 in order to fire an action. To that end, the user of the 'stick-and-glue' interaction moves the cursor 58 on the object 64 (phase b) and decreases the generalized distance until a first threshold value is reached. Upon reaching this threshold value, the object 64 is selected, which is indicated, for example, by changing the color of the selected object (phase c). When the object 64 is selected, it follows the movement of the cursor 58. The user then moves the object 64 to the target object 66 (phases d and e) and again decreases the generalized distance until a second threshold value is reached. When the second threshold value is reached, the object 64 is glued to the target object 66 and the action is fired (phase f). Alternatively, the action may be fired when the user increases the generalized distance so that the first threshold value is passed again, this time in opposite direction.

Figure 8:
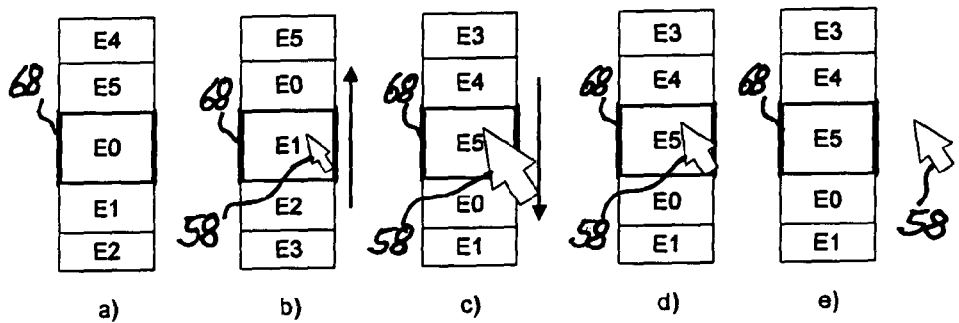
FIG. 8 shows various phases of a 'selection wheel' interaction means.

FIG. 8 shows different phases of the 'selection wheel' interaction means, in which the generalized distance controls the cyclic permutation of a list of list elements (denoted by E0 to E5 in FIG. 8). The 'selection wheel' interaction means allows to select one element from a list of elements without the need to move the cursor 58 up or down. The list of elements is logically positioned on a "wheel", whereby the last and the first list elements (E0 and E1) are glued together. The wheel is moved upwards by decreasing the generalized distance (phase b) and is moved downwards by increasing the generalized distance (phase c) in relation to a certain value of the generalized distance that holds the wheel still (phase d). One element of the list is always visible in a selection field 68. The selected list element is the one that is in the selection field 68, when the cursor 58 leaves the selection field 68 (phase e). The elements which are not in the selection field 68 may be visible or not. Alternatively, the wheel may be moved downwards by decreasing the generalized distance and may be moved upwards by increasing the generalized distance in relation to a value of the generalized distance that holds the wheel still. This interaction means is useful in the (X,Z) case. Of course, the role of the horizontal and the vertical axis may be exchanged.

Figure 9:
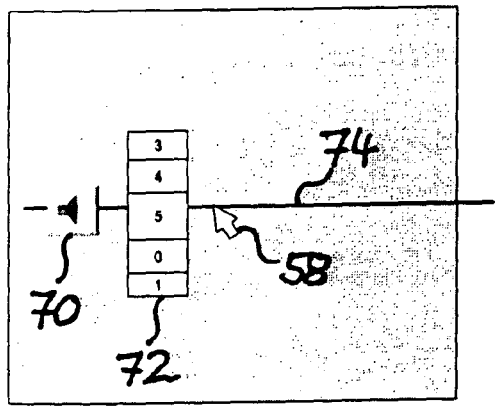
FIG. 9 shows a 'X-axis threading' interaction means.

FIG. 9 shows an example of the 'X-axis threading' interaction means. This interaction means consists in aligning other interactions means, for example, a button 70, and a selection wheel 72 on a thread axis 74, which is oriented in X-direction. This interaction means is useful in the (X,Z) case. Preferably, the Y-position at which the thread axis 74 is positioned is given by the Y-position of the cursor 58.

Description of the RSSI Measuring Mechanism

Now that the modular structures of the interaction device 2 and the reference device 1 have been explained, the measurement of the received signal strength will be described in more detail with reference to FIG. 2, which shows an example case of one antenna device 36 in the antenna send module 16 and two antenna devices 38 in the antenna receive module 18.

To calculate distances the distance calculation module 24 relies on the information provided by the antenna receive module 18. The signal level measured in one of the antenna devices 38 provides a numeric value (the RSSI) which is directly related to the voltage induced in said one of the receiver antenna devices 38 by the magnetic field generated by the transmitter antenna devices 36. The signal level is measured for all receiver antenna devices 38 separately and a RSSI value is provided for each of the receiver antenna devices 38.

The mechanism the physical layer uses to measure the signal level induced in the receiver antenna devices 38 differentiates the present invention with traditional magnetic coupling based distance and positioning systems. Instead of generating a constant continuous wave (CW) on the transmitter side to create a magnetic field that can be measured on the receiver side as proposed by U.S. Pat. No. 4,945,305, U.S. Pat. No. 6,369,564 and EP 1 601 929, for example, the present invention exploits the magnetic field which carries the data of an ongoing communication between the interaction device 2 and the reference device 1 and uses the same magnetic coupling principle for distance determination as for communication.

Magnetic induction based wireless data communication advantageously takes place through the modulation of a signal with the data to be transmitted. Like in RF wireless communication systems, the modulated signal, once filtered and up-converted, is applied to a transmission antenna device of the interaction device 2. The antenna send module 16 comprises a transmitter 76 for carrying out such processing. The transmitter 76 comprises a transmitter filter unit 78 for filtering the modulator signal, which comprises the information to be sent, an up-converter 80 for modulating a carrier signal with the modulator signal, a digital-analog-converter 82 for converting the up-converted signal into an analog signal, a low-pass filter 84 for low-pass filtering the analog signal, an amplifier 86 for amplifying the low-pass filtered signal before it is applied to the transmitter antenna device 36. The frequency range of the carrier signal is selected to be in the range of 3 MHz to 50 MHz. The upper limit of the frequency range is established by the properties of the magnetic wave propagation (near field) because below 50 Mhz the magnetic field effect clearly dominates over the electric one (far field). The present invention may however also be operated at higher frequencies. The lower limit has been established to have enough bandwidth available to fulfill the data rate requirements of the data communication part. If the data rate can be reduced the invention can also work at lower frequencies. Regulatory issues regarding maximum power transmission allowed have been considered as well.

The modulated magnetic field produced on the transmitter side by the antenna send module 16 induces a voltage on the receiver side in the receiver antenna devices 38 which allows to recover the transmitted signal and demodulate the sent data. Again, like in RF wireless communication systems, several pre-processing stages are done before the received signal can be demodulated, namely amplification, down-conversion, filtering, synchronization, automatic gain control (AGC), channel equalization, channel compensation and others, not all of which are shown with corresponding elements in FIG. 4. Besides two receiver antennas 38 for receiving the transmitted signal, the antenna receive module 18 comprises a receiver 88 for carrying out such processing. The receiver 88 comprises two amplifiers 90 for amplifying the voltage induced in each of the receiver antenna devices 38, an AGC unit 92 for measuring the RSSI value for each of the signals and changing the gain of each of the amplifiers 90 based on the corresponding RSSI value in order to compensate the attenuation of the transmitted signal caused by the communication channel, two analog-digital-converters 94 for digitizing each of the two amplified signals, two down-converters 96 for down-converting each of the two digitized signals and two receiver filter units 98 for filtering each of the two down-converted signals. Having passed the receiver filter units 98, the two signals are provided to a synchronization unit 100 which is comprised in the receiver 88. The best one of the received signals, for example the one with the highest RSSI, is provided to the data receive module 22.

As described above, the AGC unit 92 changes the gain of each of the amplifiers 90 in order to compensate for the attenuation of the transmitted signal caused by the communication channel. Unfortunately, it is the attenuation characteristic of the transmission channel which allows to determine the distance between a transmitter side antenna device 36 and an receiver side antenna device 38 by measuring how much the signal is attenuated: the higher (lower) the signal level the shorter (longer) the distance. Therefore, using AGC to recover data signal level prevents to make use of the signal level to measure distance and/or position. There is however one part of the signal which is not affected by the automatic gain control and, therefore, can be used to measure distances and/or positions: the preamble 102. It is common usage in the art of wireless data transmission to divide the data to be transmitted into portions called frames 104 and to precede every frame 104 to be transmitted over the air by a known pattern 102, which is called the preamble 102. The interaction device 2 is adapted to provide such kind of signal with a data portion 104 preceded by a preamble 102. In the reference device 1, the preamble 102 is used by the AGC unit 92 to calculate the gain that is to be applied by one of the amplifiers 90 for amplifying the incoming frame 104 received via one of the receiver antenna devices 38, is used to prepare the receiver 88 for the arrival of the frame data 104 and, more generally, is used to synchronize the receiver 88. The synchronization unit 100 recognizes the beginning and the end of the preamble 102 and the beginning and the end of the frame data 104. Based on this information, the synchronization unit 100 synchronizes the AGC unit 92 so that the correct amplification can be applied to the data portion 104 of the signal. The synchronization unit 100 also triggers the distance, position and, if applicable, orientation calculation modules 24, 26, 28 to operate during preamble time. The RSSI values measured during preamble time 102 in both receiver antenna devices 38 are provided to the distance calculation module 24 and, if applicable, to the orientation calculation module 28.

Using the preamble 102 for doing distance or position measurements while data communication is ongoing makes this solution very attractive to be used in a user interface scenario where the actions of a user (modifying the position or the distances of the mobile device relative to the receiver) trigger data communication actions.

Display Module (DM).

The optional display module 34 allows the magnetic user interface module 32 and the RDALMs 30 to communicate visually with a user. While the display module 34 may be a part of the reference device network node 1, the display module may also be located on any other node 3 of the network 4 or may only be connectable to the reference device 1 or may otherwise be accessible by the reference device 1.

Description of an Example Graphical User Interface

A graphical user interface relying on the magnetic field based positioning technology of this invention offers the ability for users to associate objects with services intuitively within a sphere of multiple dimensions. Based on the type and capabilities of the devices that are in location tracking range of each other, appropriate context related services are automatically displayed to the user. By rotating and moving the interaction device 2 in multiple dimensions, the user will be provided an intuitive representation of its actions and its possible associations with the context related services.

In the following, properties of an example (X,Z)-case user interface are explained in relation to an example setup of a magnetic network 4 which comprises a mobile device 106, for example a mobile phone, having a single antenna device and a display device 108 having two antenna devices 110, 112. The mobile device 106 is an example of the above described embodiment of the transmitting node 2 or interaction device 2. The mobile device 106 provides various services including playing audio and taking pictures. To this end, the mobile device 106 provides the appropriate IDALMs 10. The display device 108 is an example of the above described embodiment of the receiving node 2 or reference device 2. The display device 108 provides various services including displaying pictures and storing data, for example, various kinds of media on a data storage unit (not shown). To this end, the display device 108 provides the appropriate RDALMs 30. The data storage unit need not be located on the display device 108 and may, for example, be located on a home server.

Figure 10:
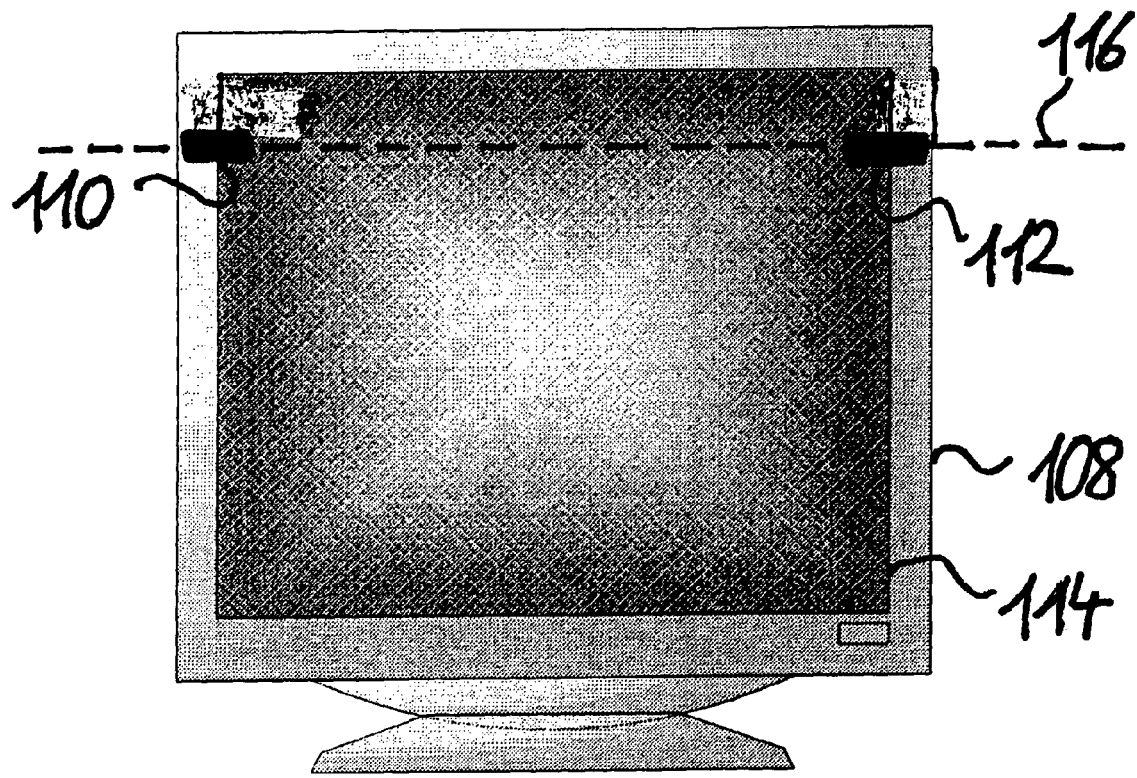
FIG. 10 shows an initial situation of a setup of a mobile device and a display device which is an example of the embodiment of the wireless data network.
Figure 10:
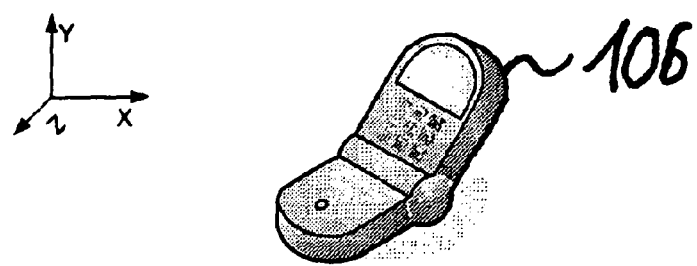

FIG. 10 depicts an initial setup of the mobile device 106 and the display device 108. The display surface 114 of the display device 108 lies within a X-Y plane, whereby the Y-axis points upwards and the X-axis points to the right. A Z-axis is orthogonal to the X-Y plane and points towards a user in front of the display device 108. One antenna device 110 of the display device 108 is located at the left edge of the display device 108. The other antenna device 112 is located at the right edge of the display device at the same height as the left side antenna device 110. Thus, a connecting line 116 connecting the two antenna devices 110, 112 is oriented horizontally. In the case of a (X,Y) user interface, the connecting line 116 is preferably located above (or below) the actual display area 114 of the display device 108. In the (X,Z) case example treated here, the connecting line 116 may be located between the upper edge and the lower edge the display area 114 without adverse effects.

In the initial setup, the mobile device 106 and the display device 108 are out of communication range. Therefore, no indication of the mobile device 106 is displayed by the display device 108. The region around the display device 108 in which the display device 108 and mobile device 106 are within communication range is the area of presence.

The user interface offers the capability to detect the presence and to identify objects that come into communication range. Once the mobile device 106 enters the communication range of the display device 108, a graphical representation 118 of the mobile device 106 which acts as a pointer icon is displayed. The graphical representation 118 follows the movements of the mobile device 106 in the X-direction. Besides being employed for the location tracking and device detection, the wireless data communication capabilities of the mobile device 106 and the display device 108 are used to transfer context data for the graphical representation 118 of the mobile device 108 and for its possible association with context related services like picture transfer or music download.

Figure 11:
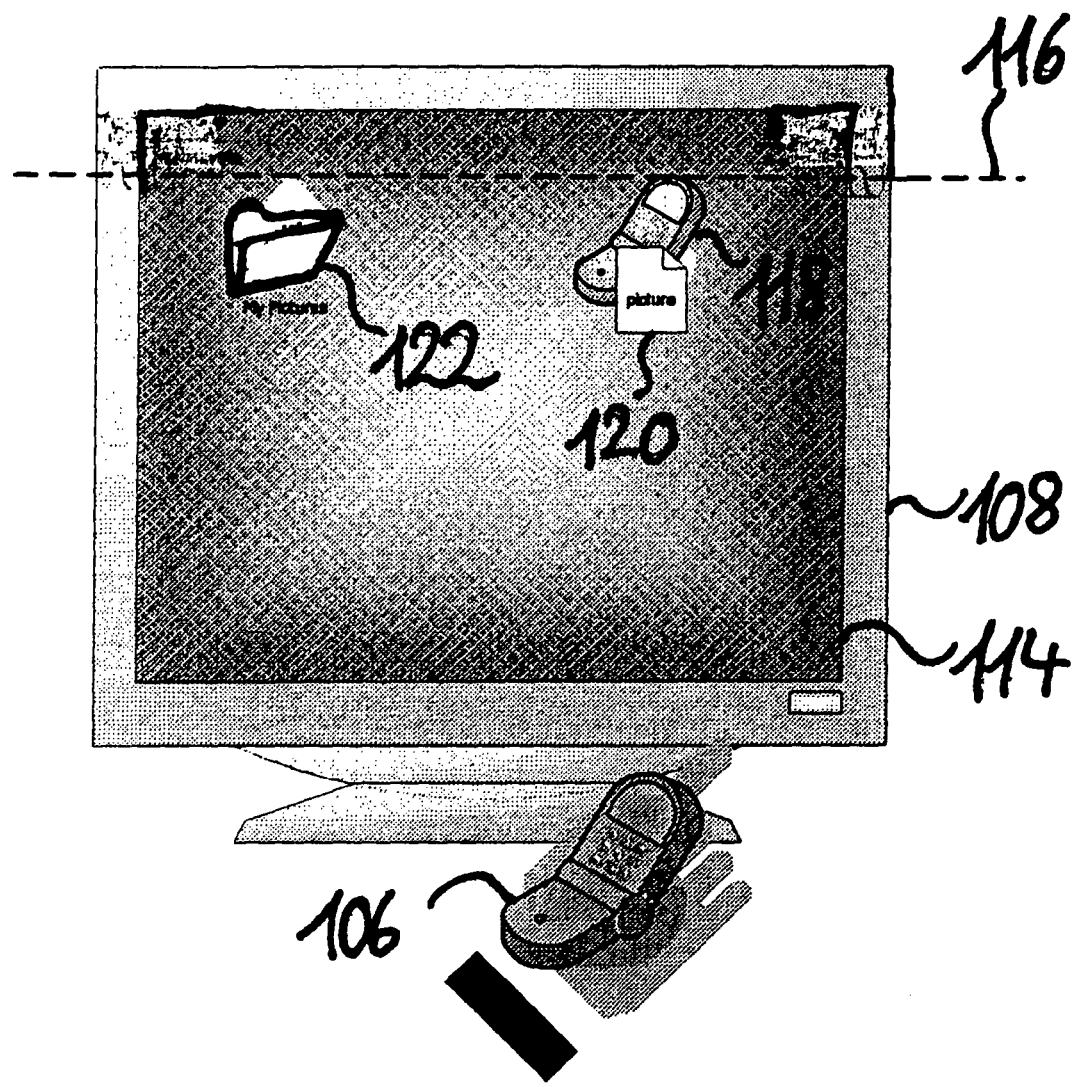
FIG. 11 shows a situation of the setup where mobile device has entered an area of presence.

FIG. 11 shows the situation where the mobile device 108 has just entered the communication range. The antennas device 110, 112 are not shown in the following figures. To indicate to the user that both devices have detected each other, the graphical representation 118 of the mobile device 108 with its services is depicted by the display device 108. In this example, the availability of a picture file on the mobile device 106 is indicated by a file symbol 120 representing a picture file. The file symbol 120 is superimposed on the graphical representation 118. The X-position of the graphical representation 118 is in accordance with the X-position of the mobile device 106, which is located to the right of a vertical center plane of the display device 108. In addition, the context related services of the display device 108 are displayed in form of a service icon 122 by the display device 108. In this example, the service icon 122 is a folder symbol 122 indicating the file storage capacities of the display device 108. The service icon 122 is displayed at the same Y-position as the graphical representation 118, that is, the service icon 122 is displayed on a common horizontal thread axis (not shown) as the graphical representation 118. As the user physically moves the mobile device 106, the graphical representation 118 changes size and moves within the display area of the display device 108. When the generalized distance is decreased, for example by moving the mobile device 106 towards the display device 108 along the Z-direction, the graphical representation 118 becomes smaller. When the generalized distance is increased, for example by moving the mobile device 106 away from the display device 108 along the Z-direction, the graphical representation 118 becomes larger. When the mobile device 106 moves to the right along the X-direction, its graphical representation 118 moves to the right along the X-direction. When the mobile device 106 moves to the left along the X-direction, its graphical representation 118 moves to the left along the X-direction. A movement of the mobile device 106 in Y-direction may have an influence on the Y-position of its graphical representation 118 but does not affect the X-position of its graphical representation 118. For ease of explanation, it is assumed in the following that the user increases and decreases the generalized distance by moving the mobile device 106 away from or towards the display surface 114 along the Z-direction.

Figure 12:
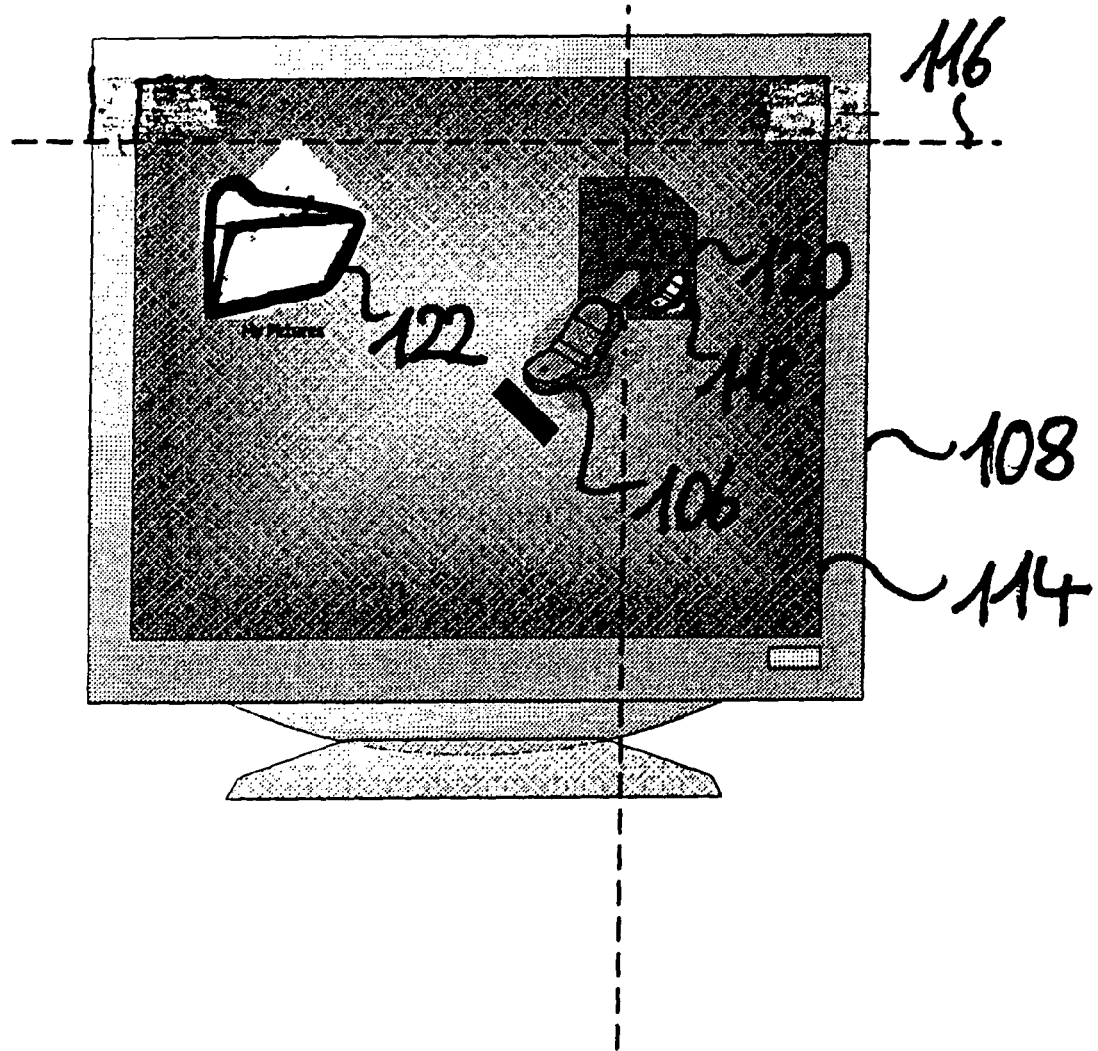
FIG. 12 shows a situation of the setup where a file symbol has been selected by moving the mobile device.

The user interface offers the capability to select an object. This capability is described with reference to FIG. 12. An object is selected by moving the mobile device 106 close to the display surface 114 into the area of the graphical representation of the object, here, the file symbol 120, and holding it there for a certain amount of time. This approach offers the possibility to avoid pressing any kind of buttons to confirm the selection request. Once the mobile device 106 is below a certain threshold of distance, a count down is initialized to visualize the start of the selection procedure. The visualization can, for example, be performed by changing the color, shape or texture of the selected object and may be accompanied by a timer element as in the case of the 'Z click'. Once the count down has been successfully finished, the selected object 120 becomes virtually sticky. The count down operation and its associated selection procedure can be aborted by increasing the distance beyond the threshold or by leaving the area of the graphical representation of the mobile device 106. It is to be noted here, that in general each action can be interrupted or terminated by leaving the area of presence. The successful selection of a file symbol may, for example, be visualized by a change of the object color. FIG. 12 shows the situation where the user has successfully selected the file symbol 120. Note that the graphical representation 118 overlays the file symbol 120. As the size of the graphical representation has decreased in correspondence with the approach of the mobile device 106 to the display surface 114, the file symbol 120, if displayed overlaying the graphical representation 118, would cover the graphical representation 118. The problem of visibility of objects located at the same position may also be solved by translucent object icons.

Figure 13:
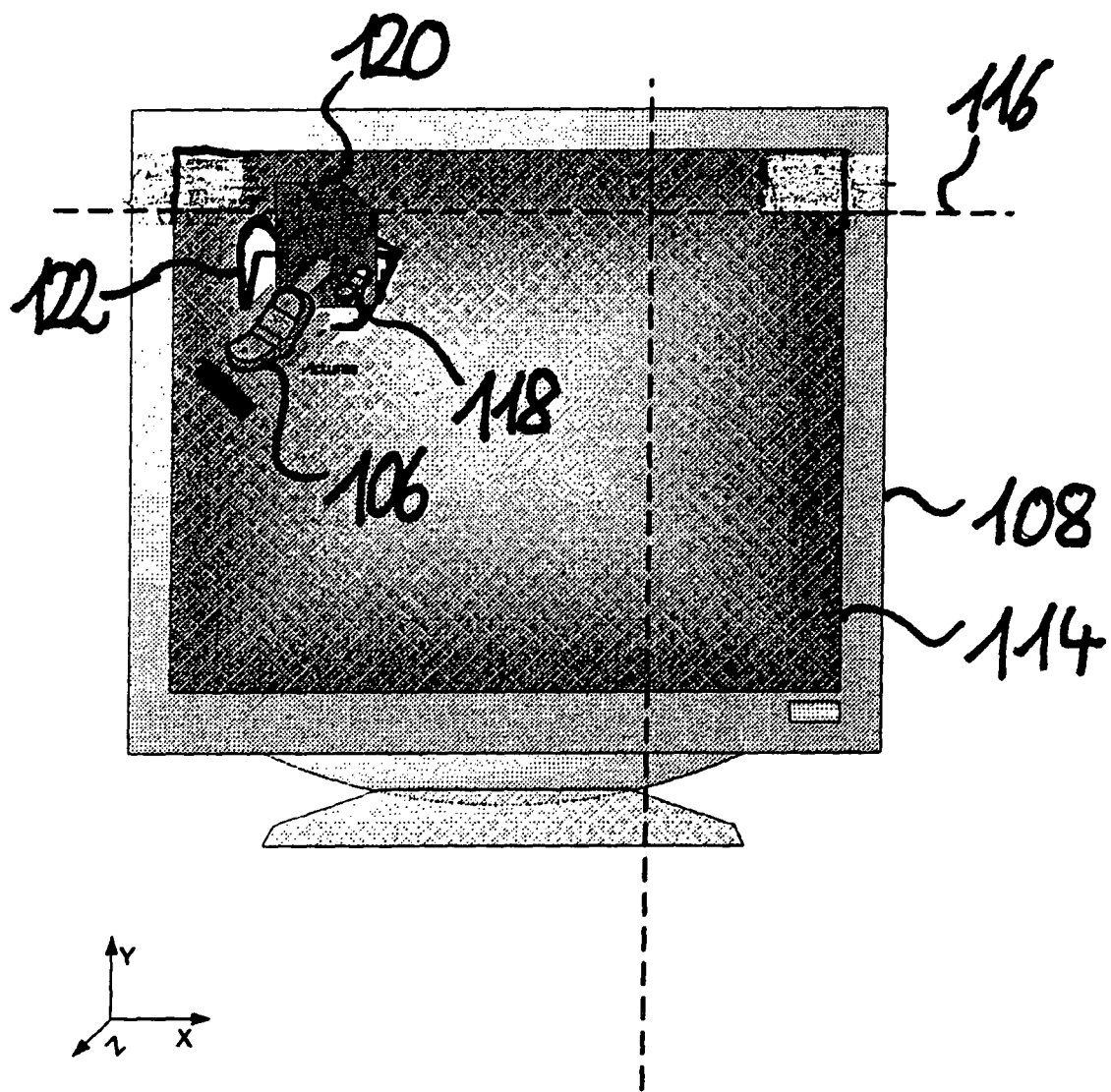
FIG. 13 shows a situation of the setup where the selected file symbol has been moved by moving the mobile device.

The user interface offers the capability to move an object responsive to user movements. This capability is described with reference to FIG. 13. As described above, a selected object 120 changes to sticky mode and will thus follow the movements of the mobile device 106. The sticky mode lasts until the mobile device 106 increases the distance to the display surface 114 until the a certain threshold of the generalized distance is reached or until another context related object is selected. In the case of a (X,Y,Z) user interface, the selected object 120 follows the movements of the mobile device in X- and Y-direction. In the (X,Z)-case explained here, the selected object 120 follows only the X-direction movements. FIG. 13 shows the situation where the file symbol 120 has been dragged over the folder symbol 122.

Figure 14:
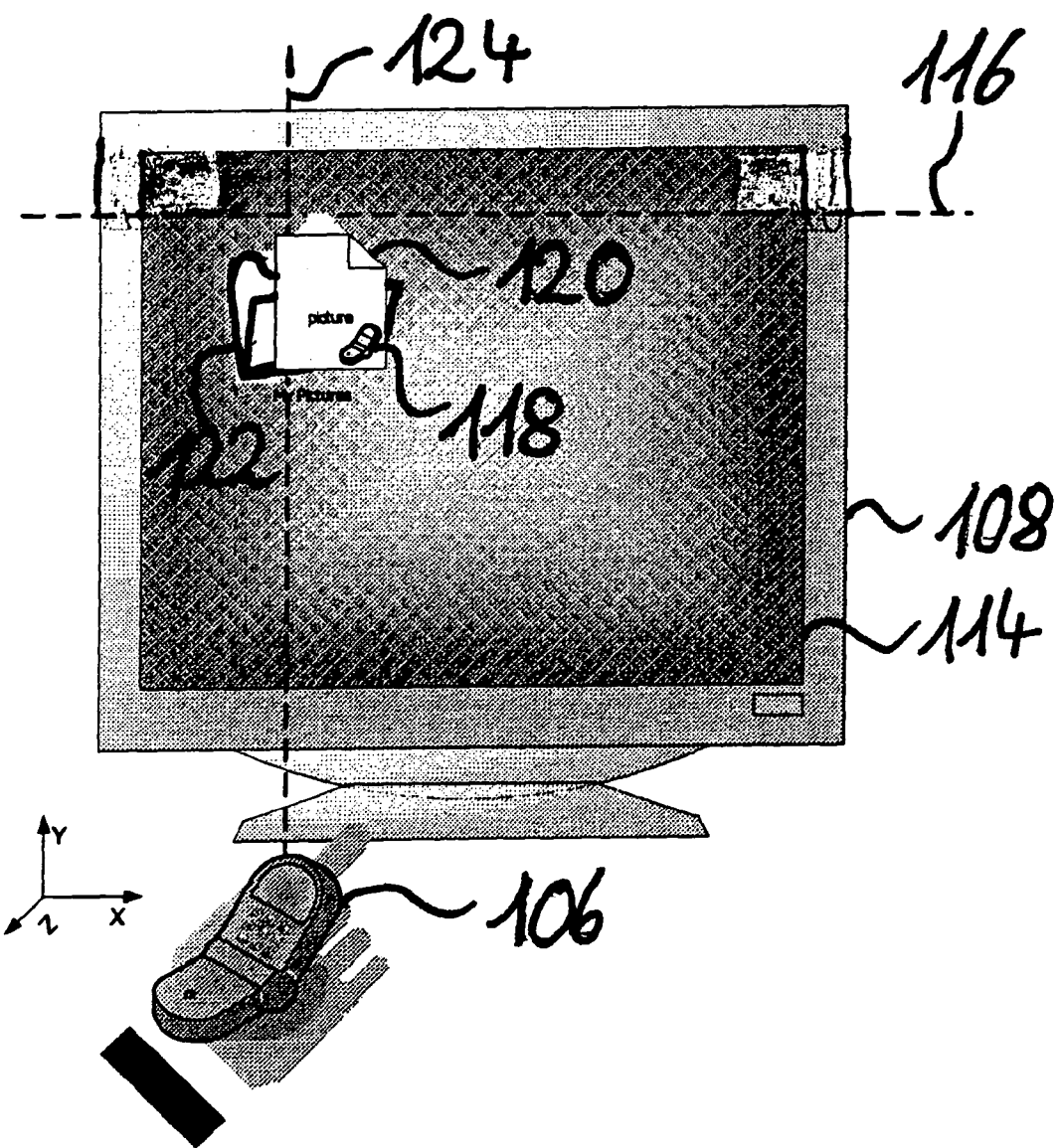
FIG. 14 shows a situation of the setup where the file symbol is dropped onto a drop target by moving the mobile device.

The user interface offers the capability to identify context related drop targets and to drop objects onto context related drop targets response to user input. This capability is described with reference to FIG. 14. The file server service of the display device 108 has been identified as a potential context related drop target. A selection of a drop target is accepted once a release event is processed. The release event is detected by increasing the generalized distance above a certain level by moving the mobile device 106 away from the display surface 114 while keeping the X-position 124 stable within the area of the icon 122 representing the drop target.

Figure 15:
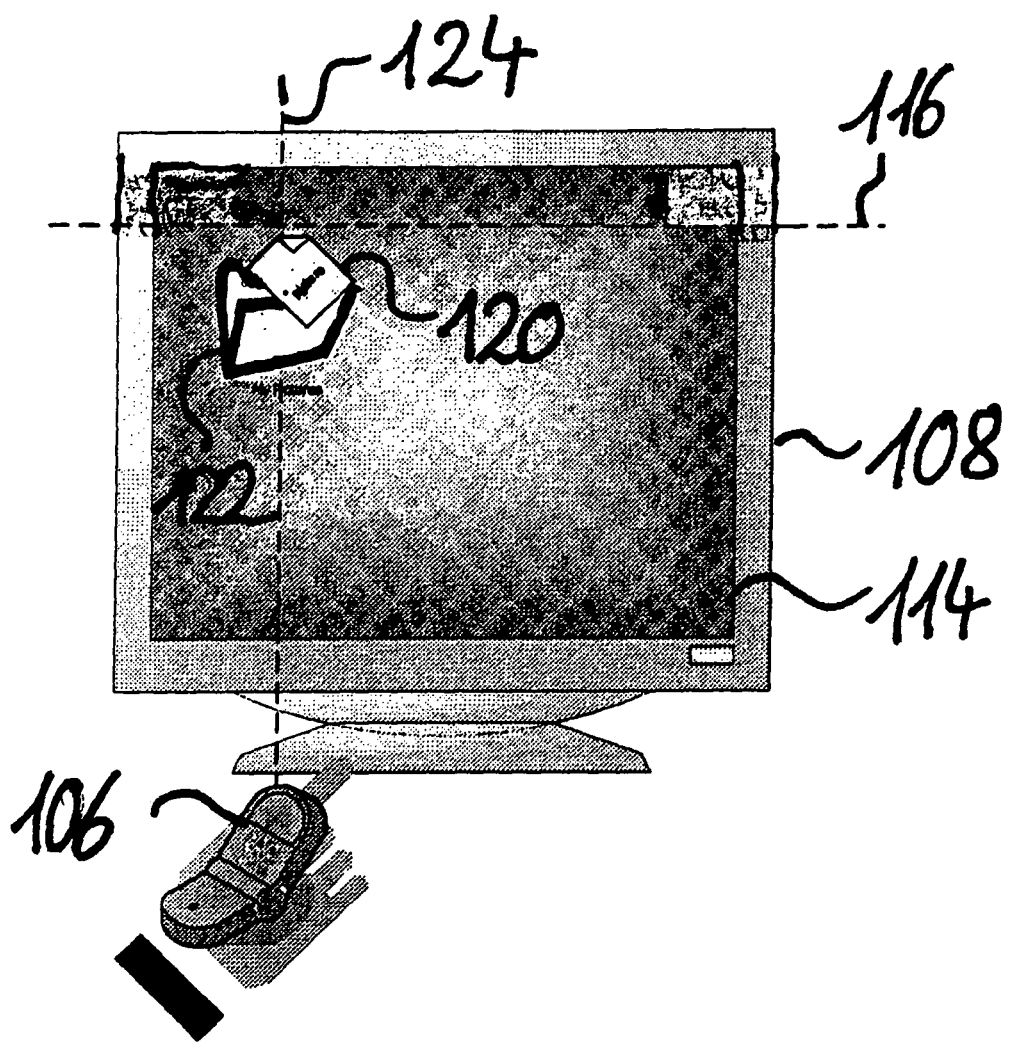
FIG. 15 shows a situation of the setup where the successful dropping of the file symbol is indicated to a user.

The user interface offers the capability to present the user the result of its interactions depending on the target service characteristics. FIG. 15 shows a successful file transfer service interaction after the file object represented by file symbol 120 has been dropped onto the file server object represented by the folder symbol 122. To visualize the user interaction, the transferred file is represented as part of the folder symbol 122.

FIG. 16 shows an antenna send module 16 with two antenna devices 36-1, 36-2 and an antenna driving circuit 126. The data send module 14 selects which antenna device is used to send a signal and instructs the antenna driving circuit 126 to feed an antenna accordingly.

While the preferred embodiments of the present invention have been disclosed and detailed herein, it will be apparent to those skilled in the art that various changes may be made to the configuration, operation and form of the invention without departing from the scope of the invention defined in the following claims. In particular, it is noted that the respective features of the invention, even those disclosed solely in combination with other features of the invention, may be combined in any combination excepting those readily apparent to those skilled in the art as nonsensical.

The invention claimed is:

1. A receiving node for a wireless data network comprising:
   an antenna receive module that receives one or more data signals emitted from a transmitting node of the wireless data network; and
   a calculation module that calculates an orientation of the transmitting node in relation to an orientation of the receiving node, wherein said reception of said one or more data signals are based on magnetic induction, and said calculation of said orientation of said transmitting node is based on said one or more data signals,
   said one or more data signals comprise one or more preamble portions and said calculation of said orientation of said transmitting node is based on said one or more preamble portions,
   said wireless data network comprises a node that controls an output device,
   said receiving node further comprises a user interface module that provides, in cooperation with said transmitting node and said output device, a user interface functionality, whereby said provided user interface functionality is based on the calculated orientation of said transmitting node,
   the output device displays information on a two dimensional display surface, and
   said user interface module calculates a position on a two dimensional reference surface based on the calculated orientation of said transmitting node, whereby the position on said two dimensional reference surface corresponds to a position on said two dimensional display surface.

2. The receiving node according to claim 1, wherein said antenna receive module determines one or more received signal strength indication (RSSI) values, whereby an RSSI value indicates a strength of one of said one or more received data signals, and said calculation of said orientation of said transmitting node is based on said one or more RSSI values.

3. A receiving node for a wireless data network, said wireless data network comprising:
  a node that controls an output device that displays information on a two dimensional display surface, and said receiving node comprising:
  an antenna receive module that receives one or more data signals emitted from a transmitting node of the wireless data network;
  a calculation module that calculates one or more distances between the receiving node and the transmitting node, and/or calculates a position of the transmitting node in relation to a position of the receiving node, and/or calculates an orientation of the transmitting node in relation to an orientation of the receiving node; and
  a user interface module that provides, in cooperation with said transmitting node and said output device, a user interface functionality, whereby said provided user interface functionality is based on the calculated one or more distances, the calculated position of said transmitting node, and/or the calculated orientation of said transmitting node, and that calculates a position on a two dimensional reference surface based on the calculated one or more distances and/or the calculated position of said transmitting node, whereby the position on said two dimensional reference surface corresponds to a position on said two dimensional display surface, wherein said reception of said one or more data signals is based on magnetic induction, and
  said calculation of said one or more distances, said position of said transmitting node, and/or said orientation of said transmitting node is based on said one or more data signals.

4. The receiving node according to claim 3, wherein said antenna receive module determines one or more received signal strength indication (RSSI) values, whereby an RSSI value indicates a strength of one of said one or more received data signals, and said calculation of said one or more distances, said position of said transmitting node, and/or said orientation of said transmitting node is based on said one or more RSSI values.

5. The receiving node according to claim 3, wherein said wireless data network comprises a node that controls an output device, and
  said receiving node further comprises a user interface module that provides, in cooperation with said transmitting node and said output device, a user interface functionality, whereby said provided user interface functionality is based on the calculated one or more distances, the calculated position of said transmitting node, and/or the calculated orientation of said transmitting node.

6. A receiving node for a wireless data network comprising:
  an antenna receive module that receives one or more data signals emitted from a transmitting node of the wireless data network, wherein said antenna receive module determines one or more received signal strength indication (RSSI) values, whereby an RSSI value indicates a strength of one of said one or more received data signals; and
  a calculation module that calculates one or more distances between the receiving node and the transmitting node, and/or calculates a position of the transmitting node in relation to a position of the receiving node, and/or calculates an orientation of the transmitting node in relation to an orientation of the receiving node,
  wherein said reception of said one or more data signals is based on magnetic induction,
  said calculation of said one or more distances, said position of said transmitting node, and/or said orientation of said transmitting node is based on said one or more data signals and said one or more RSSI values,
  said antenna receive module comprises two antenna devices that receive said one or more data signals,
  said two antenna devices lie on an X-axis of an orthogonal coordinate system defined by said X-axis, a Y-axis, and a Z-axis,
  the calculated position of said transmitting node is the position of a reference point of said transmitting node,
  the calculated position of said transmitting node is described by one or more coordinate values comprising a first coordinate value,
  a reference plane parallel to a X-Y-plane is defined,
  a normal orientation of the transmitting node is defined in which a straight line defined by said reference point and a second point of the transmitting node which is lying between said reference plane and said reference point is parallel to the Z-axis, and
  moving said transmitting node in positive X-direction while keeping said transmitting node in said normal orientation and tilting said transmitting node out of said normal orientation in a way that said second point is moved in positive X-direction while keeping the position of said transmitting node constant both increase said first coordinate value.

7. The receiving node according to claim 6, wherein said wireless data network comprises a node that controls an output device, and
  said receiving node further comprises a user interface module that provides, in cooperation with said transmitting node and said output device, a user interface functionality, whereby said provided user interface functionality is based on the calculated one or more distances, the calculated position of said transmitting node, and/or the calculated orientation of said transmitting node.

8. The receiving node according to claim 6, wherein said two antenna devices of said antenna receive module are coplanar.

9. The receiving node according to claim 6, wherein said two antenna devices of said antenna receive module are parallel.

10. The receiving node according to claim 6, wherein each of said two antenna devices is orthogonal to the X-Y plane.

11. The receiving node according to claim 6, wherein said straight line defined by said reference point and said second point corresponds to a direction where the strength of a data signal emitted by said transmitting node has a local or a global maximum.

12. The receiving node according to claim 6, wherein said one or more coordinate values describing said calculated position of said transmitting node comprise a second coordinate value, and
  moving said transmitting node in a positive Z-direction while keeping said transmitting node in said normal orientation increases said second coordinate value, and tilting said transmitting node out of said normal orientation in a way that said second point is moved in a Y-direction while keeping the position of said transmitting node constant either increases or decreases said second coordinate value.

13. The receiving node according to claim 12, further comprising:
a user interface module that provides user interface logic operable to control a size of a pointer icon depicted by a display device based on said second coordinate value.

14. The receiving node according to claim 13, wherein said user interface logic controls selection and deselection of objects displayed by said display device based on said second coordinate value.

15. The receiving node according to claim 6, wherein said one or more coordinate values describing said calculated position of said transmitting node comprise a second coordinate value, and
moving said transmitting node in a positive Y-direction while keeping said transmitting node in said normal orientation and tilting said transmitting node out of said normal orientation in a way that said second point is moved in the positive Y-direction while keeping the position of said transmitting node constant both increase said second coordinate value.

16. The receiving node according to claim 15, wherein said transmitting node is located in the X-Y plane.

17. The receiving node according to claim 6, wherein said reference plane is the X-Y plane.

18. The receiving node according to claim 1 or 4, wherein said transmitting node has an associated pointing direction, said user interface module calculates said pointing direction based on the calculated orientation of said transmitting node, and
said position on said reference surface is based on said pointing direction.

19. The receiving node according to claim 18, wherein said calculated position on said reference surface corresponds to an intersection of said reference surface with a straight line that is defined by said position of said transmitting node and said pointing direction of said transmitting node.

20. The receiving node according to claim 1 or 3, wherein a size of a pointer icon that is provided as a component of said user interface functionality is based on the distance between the calculated position of said transmitting node and said position on said reference surface.

21. The receiving node according to claim 3 or 6, wherein said one or more data signals comprise one or more preamble portions and said calculation of said one or more distances, said position of said transmitting node, and/or said orientation of said transmitting node is based on said one or more preamble portions.

22. A wireless data network based on magnetic induction comprising:
a receiving node for the wireless data network according to claim 1, 3, or 6.

* * * * *